United States Patent

[11] 3,592,234

| [72] | Inventor | George T. Baltus<br>Tonawanda, N.Y. |
|---|---|---|
| [21] | Appl. No. | 844,784 |
| [22] | Filed | July 25, 1969 |
| [45] | Patented | July 13, 1971 |
| [73] | Assignee | Bell Aerospace Corporation |

[54] STAGED-FLOW VALVE
11 Claims, 2 Drawing Figs.

[52] U.S. Cl. .................................................. 137/625.62
[51] Int. Cl. .................................................. F15b 5/00,
F 16k 11/07 F 16k 11/10
[50] Field of Search ........................................... 137/82-
—86, 625.61, 625.62, 625.63, 625.64

[56] References Cited
UNITED STATES PATENTS

| 3,054,388 | 9/1962 | Blatnon | 137/85 X |
| 3,357,444 | 12/1967 | Zeuner | 137/625.62 X |
| 3,363,366 | 1/1968 | Estabrook | 137/83 X |
| 3,464,318 | 9/1969 | Thayer et al. | 137/625.62 X |

Primary Examiner—Henry T. Klinksiek
Attorney—Nilsson, Robbins, Wills and Berliner ABSTRACT: A double-legged two-stage servo valve in which metering to load is provided by both a low-flow second stage and a high-flow second stage, the high flow stage becoming operative when a predetermined pressure differential is exceeded. Specifically, the first stage is a flapper valve driving, with mechanical feedback, a low-flow second stage four-way spool valve over a portion of the full signal input and driving a high-flow second stage spring-centered four-way spool vale for the remainder of the signal range.

PATENTED JUL 13 1971 3,592,234

INVENTOR
GEORGE T. BALTUS

BY Nilsson & Robbins.
Attorneys.

STAGED-FLOW VALVE

BACKGROUND OF THE INVENTION

1. Field of the Invention

The fields of art to which the invention pertains include the fields of hydraulic valves and pneumatic valves.

2. Description of the Prior Art

The term "hydraeric" as used throughout the specification and claims is defined as being generic to liquids and gases and to include generally both hydraulics and pneumatics.

In the utilization of servocontrol systems, it is often desirable to provide both high and low-flow control. For example, in controlling large radar antenna, accurate low-flow control is generally required, but occasionally a high velocity may be necessary to slew the antenna wherein high-flow control is required but high precision is not necessary. If conventional two-stage of three-stage servo valves are utilized for this purpose, performance parameters for low-flow operation, such as pressure gain, null variance, flow gain through null, hysteresis, etc., are referenced to the overall control system including the high-flow control, resulting in a sacrifice of precision in performance at low flow.

SUMMARY OF THE INVENTION

The present invention provides a servo valve in which low-flow control is isolated from high-flow control. The performance parameters are all referenced to the low-flow control to increase precision of performance at low flow. The valve is a double-legged two-stage servo valve in which metering to load is provided by both a low-flow second stage and high-flow second stage, the high-flow second stage becoming operative when predetermined pressure differential in the spool end chambers is exceeded.

Specifically, a staged-flow valve is provided, comprising: (1) a source of hydraeric fluid; (2) means defining a path for the fluid; (3) signal receiving means including means for generating hydraeric pressure differentials in the path; (4) a relatively low-flow servo member comprising a low-flow spool formed to meter low hydraeric fluid flow upon its displacement and means for directing pressure differentials thereacross; and (5) a relatively high-flow valve member comprising a high-flow spool formed to meter high hydraeric fluid flow upon its displacement, means for directing a pressure differential thereacross and means for biasing the high-flow spool against displacement in this case prior to full displacement of the low-flow spool. Feedback means operatively associated with the low-flow spool and with the signal-receiving means limit static pressure differentials across the low-flow spool to relatively low levels over its displacement range. The high-flow spool chambers are hydraulically connected to the low-flow spool chambers so that when the low-flow spool is fully translated, a further increase in input signal causes the high-flow spool to be displaced against its bias from its null position to open up independent, parallel flow paths.

Design parameters are utilized such that full translation of the low-flow spool corresponds to only a portion of the full signal input to the valve. When the low-flow spool bottoms out, further increases in input signal results in proportionately increasing differential pressures to effect proportional displacement of the high-flow spool from its null position. The metering edge overlaps of the high-flow spool can be made relatively large so that flow grinding of the high-flow spool is not required, and this also minimizes leakage across the edges of the high-flow spool so that its hydraeric interaction with the low-flow spool and the load is negligible.

DETAILED DESCRIPTION

Figure 1:
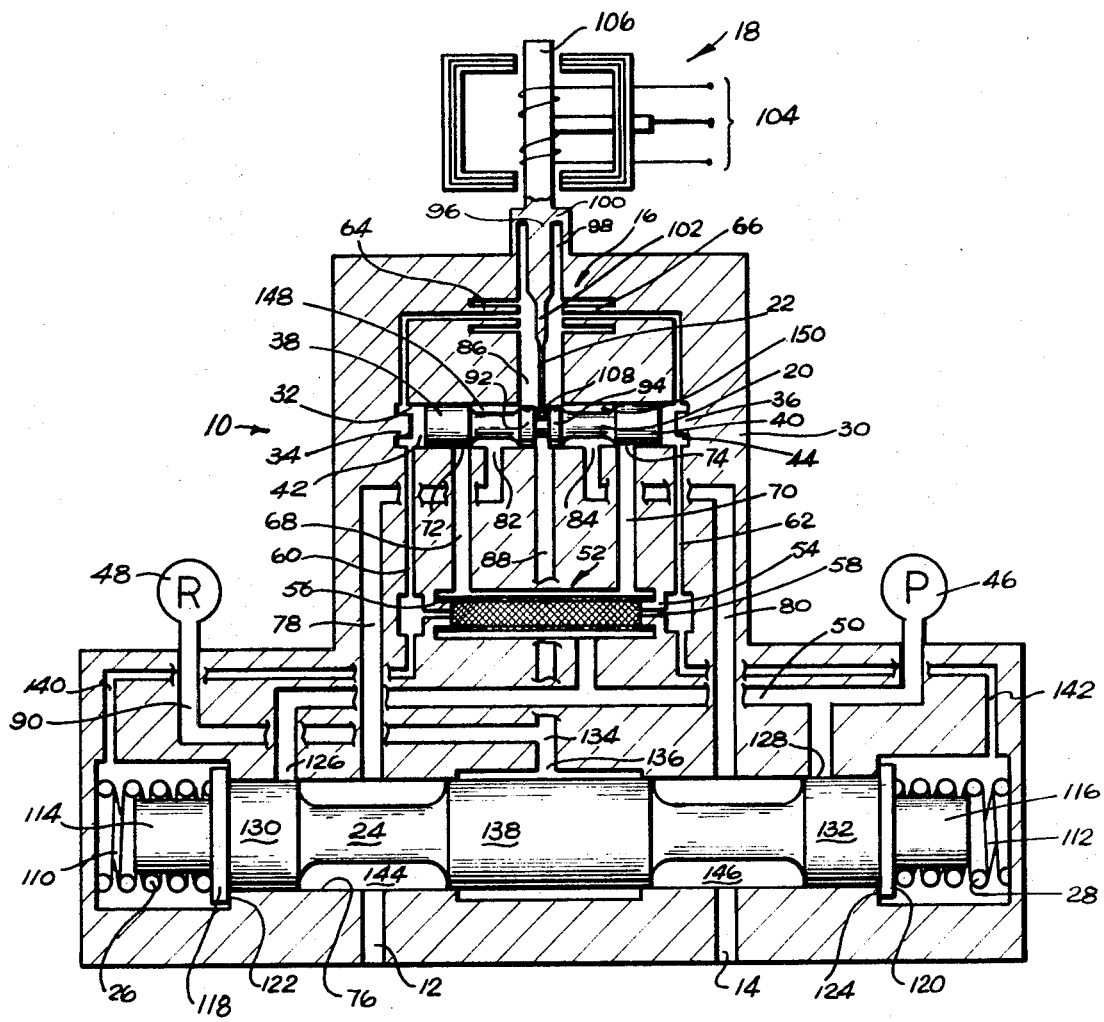
FIG. 1 is a schematic cross-sectional view of a valve constructed in accordance with this invention.

Referring to FIG. 1, there is illustrated schematically a staged flow servo valve 10 for low flow-high flow metering of hydraeric fluid through output ports 12 and 14 to thereby control a load. The servo valve 10 can be briefly described as a double-legged two-stage servo valve in which metering to the load is provided by both a low-flow second stage and a high-flow second stage. Specifically, the first stage is a four-way flapper valve, indicated generally at 16, which drives the low-flow and high-flow second stages and which is driven by a torque motor, indicated at 18, as known to the art. The low-flow second stage is comprised of components which define a four-way spool valve, including a low-flow spool 20 and a feedback element 22 mechanically connecting the low-flow spool 20 and the torque motor 18. The high-flow stage is comprised of components defining a spring-loaded four-way spool valve, including a high-flow spool 24 which is centered by centering springs 26 and 28 on each side of the high-flow spool 24.

Referring to the drawing in more detail, the servo valve 10 includes a housing 30 defining a plurality of chambers and passageways for effecting a hydraeric control system. Thus, a low-flow chamber 32 or bore is defined for the low-flow spool 20 and in which the low-flow spool 20 is disposed for translation. The housing 30 defines a pair of stops 34 and 36 on opposite ends of the chamber 32 for abutment thereagainst of the end lands 38 and 40 of the low-flow spool 20. Annular spaces are defined around the stops 34 and 36 to constitute pressure chambers 42 and 44 wherein a pressure differential may be established across the low-flow spool 20.

A source 46 of hydraeric fluid is provided in communication with a network of passageways defined by the housing 30 to conduct the hydraeric fluid to the ends of the low-flow spool 20 to thereby provide means for establishing differential pressure across the spool 20, and a system return 48 is provided therefor. As shown, hydraeric fluid from the source 46 is conducted through a passageway 50 through an enlarged passage portion 52, in which a filter 54 is disposed, through fixed restrictions 56 and 58 and via branch passageways 60 and 62 to opposite sides of the low-flow spool 20. The hydraeric fluid is from there conducted to the oppositely disposed nozzles 64 and 66 of the above-referred-to flapper valve 16.

Branch passageways 68 and 70 are defined from the filter chamber 52 to the low-flow chamber 32 to supply pressure ports 72 and 74 thereat. The control ports 72 and 74 are spaced so that when the low-flow spool 20 is in its normally centered or null position, the control ports 72 and 74 are covered or closed by the respective end lands 38 and 40 of the spool 20.

The housing 30 defines a high-flow chamber 76, substantially larger than the low-flow chamber 32, for translation therein of the high-flow spool 24. The output load ports 12 and 14 communicate directly with the high-flow control chambers 144 and 146. The housing 30 further defines passageways 78 and 80 between the low-flow control ports 82 and 84 and the high-flow control chambers 144 and 146, thereby effecting communication between the low-flow control chambers 148 and 150 and the output load ports 12 and 14.

The passageways 78 and 80 communicate with the low-flow spool control chambers 148 and 150 by means of spaced ports 82 and 84 which are so placed that they remain uncovered in all translation positions of the spool 20, i.e., they are adjacent reduced portions of the spool 20 at all times. The housing 30 defines a return chamber 86 in communication with the system return 48 via passageways 88 and 90 thereto. Low-flow spool 20 has two centrally disposed lands 92 and 94 which essentially block the flow from control chambers 148 and 150 to return chamber 86 when the spool is in its neutral position.

It will be seen that the low-flow pressure ports 72 and 74 and control ports 82 and 84, and central lands 92 and 94 are so disposed that translation of the low-flow spool 20 within its bore 32 in either direction will immediately uncover one or the other of the pressure ports 72 or 74, depending on the direction of movement of the spool. Such translation thereby effects communication between the uncovered pressure port 72 and 74 and the respective control port 82 or 84, while effecting communication between the other control port and the return chamber 86. The result is control of fluid pressure to the output load ports 12 and 14 to effect desired movement of the load. This control is accurately proportional to the extent of translation of the spool 20 as a result of the feedback mechanism of actuation, as described further hereinafter.

The pressure differentials applied across the spools 20 and 24 are controlled by a flapper valve 16, which includes a stem 96 having its lower or inner end extending into the return chamber 86 through an opening 98 in the housing 30. The opening 98 is of a substantially greater diameter than that of the stem portion therein to permit operative movement of the stem. The lower end portion of the stem 96 is sealed to prevent leakage therepast by means of a tubular, isolation diaphragm 100 which provides a flexible pivotal support for the stem as well as a seal therefor, all as known to the art. The stem 96 has a lower portion 102 disposed between the spaced ends of the nozzles 64 and 66 and which is adapted to move toward and away from the adjacent ends of the nozzles to thereby vary the effective openings in the nozzle ends.

Various means may be utilized to actuate the flapper valve 16. As viewed in the drawing, the outer end portion of the stem 96 is adapted to swing clockwise and counterclockwise to thereby swing the lower stem portion 102 toward and away from the open ends of the nozzles 64 and 66. One means for actuating the flapper valve 16 comprises a torque motor 18, and includes coils 104 appropriately connected to suitable electrical equipment, not shown. The upper portion 106 of the stem 96, exteriorly of the diaphragm 100, comprises an armature of suitable material to be magnetically actuated and which is operatively disposed relative to the coils 104 so that energization of the coils will effect desired operative movement of the armature 106.

As noted, the flapper valve includes a feedback element 22 which extends from the lower end 102 of the stem 96, through the return chamber 86. The feedback element 22 is formed at its lower free end 102 with a rounded enlargement 108 which engages the spool 20 between the central lands 92 and 94 thereof. The provision of feedback to the low-flow spool 20 is an important aspect of this construction since it allows the low-flow spool 20 to effect accurate proportional control of the load to the extent of its translation within its bore 32. Importantly, the feedback limits static pressure differentials across the spool 20 over its displacement or translation range, which allows the high-flow spool to be restrained against displacement by such differentials.

Referring now to the high-flow second stage in more detail, the high-flow chamber or bore 76 is defined with enlarged outer end chamber portions 110 and 112 into which project the ends 114 and 116 of the high-flow spool 24. The high-flow spool ends 114 and 116 extend through annular members 118 and 120 which are formed to slide within the enlarged chamber portions 110 and 112, respectively, but which are retained against movement into the central portion of the chamber 76 by means of the shoulders 122 and 124 which define the boundary between the central portion of the chamber 76 and the outer enlarged chamber portions 110 and 112. As previously noted, centering springs 26 and 28 are disposed within the enlarged chamber portions 110 and 112 to preload the high-flow spool 24 at its null position.

The housing 30 defines passageways from the main pressure line 50 to pressure ports 126 and 128 into the high-flow control chamber 144 and 146, which pressure ports are covered or closed by end lands 130 and 132, respectively, on the high-flow spool 24. A central passageway 134 effects communication between a centrally defined return port 136 and the system return 48, which return port 136 is covered or closed by a land 138 centrally disposed on the high-flow spool 24.

Operation of the high-flow stage is similar to that of the low-flow stage in that translation of the high-flow spool 24 in either direction uncovers one or the other of the pressure ports 126 or 128 depending on the direction of movement of the spool 24. However, it is generally not necessary or desirable to provide immediate uncovering of these ports and metering edge overlaps can be made relatively large, thereby effecting savings in machining costs.

The preloaded centering springs 26 and 28 prevent translation of the high-flow spool 24 until a predetermined pressure differential is established thereacross sufficient to overcome its neutral preload. Pressure differentials across the high-flow spool 24 are effected by means of passageways 140 and 142 between and enlarged end chamber portions 110 and 112 and the filter chamber 52 and fixed restrictions 56 and 58. In this manner, the high-flow end chambers 110 and 112 are hydraerically connected in parallel to the low-flow spool end chambers 42 and 44.

Importantly, design parameters of the centering springs, torque motor and other components can be chosen so that full translation of the low-flow spool 22 corresponds to only a portion of the full signal input to the torque motor 18 and the pressure differentials effected in the high-flow spool chambers 110 and 112 during translation of the low-flow spool 22 are insufficient to overcome the reload of the centering springs 26 and 28. However, when the low-flow spool 22 bottoms out against one or the other of the stops 34 or 36, further increases in input signal to the torque motor 18 result in proportionately increasing differential pressures in the high-flow spool chambers 110 and 112, since feedback no longer limits differentials. Such differentials are sufficient to overcome the preload of the centering springs 26 and 28 and effect proportional translation of the high-flow spool 24 from its null position. The pressure port 126 or 128 at the high-flow stage is connected directly to the pressure source 46 and control chamber 144 or 146 is connected to return chamber 136 without intervention of a filter, (or if a filter is utilized, the ports thereto and therefrom are sufficiently enlarged to allow voluminous passage of fluid). Accordingly, relatively high volumes of fluid are caused to flow through the load ports 12 and 14 upon translation of the high-flow spool 24.

Figure 2:
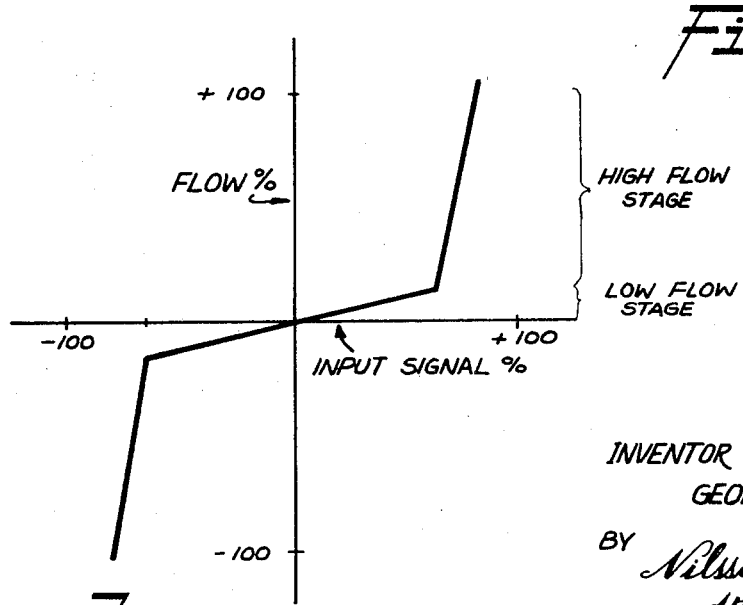
FIG. 2 is a plot of fluid flow versus input signal obtained when utilizing this invention.

Summarizing operation of the valve, and referring to FIG. 2, which is schematically drawn, the torque motor 18 is designed in this particular embodiment so that spool 20 displacement for rated full flow of the low-flow stage corresponds to approximately 65 percent of the full signal input to the torque motor 18. The low-flow stage effects a maximum of approximately 15 percent of the total flow capacity of the valve. As the signal to the torque motor 18 increases past the point where the low-flow spool 20 bottoms out against one or the other of the stops 32 or 36, further increases in the input signal causes the high-flow spool 24 to be displaced from its null position to open up parallel flow paths to rapidly effect full valve flow.

Where very accurate flow proportionality with high flow is not required, the foregoing construction allows high flow to be effected with a more economical valve than a conventional three-stage servo valve, and allows more precise servo performance in the proportional, low-flow region since percentage performance parameters, e.g. pressure gain, null variance, flow gain through null, hysteresis, etc., are all referenced to the lower servo flow. Therefore, with respect to the overall control system, the errors or nonlinear effects due to these parameters will be reduced by approximately the ratio of the low flow to the total flow rating.

What I claim is:
1. A staged-flow valve, comprising:
   a control first stage for developing pressure control signals responsive to application of input signals thereto;
   two metering second stages connected between a source of fluid under pressure and a load apparatus, one of said second stages being formed to meter low flow, the other of said second stages being formed to meter high flow;

means connecting said pressure control signals to said metering second stages for effecting metering of fluid flow to said load apparatus; and means connected to said other of said second stages for precluding operation thereof until after said one of said second stages has effected low flow metering.

2. The valve of claim 1 wherein said low-flow metering stage comprises a four-way spool valve and said high-flow metering stage comprises a spring-centered four-way spool valve.

3. A staged-flow valve, comprising:
1. a source of hydraeric fluid;
2. means connected to said source and defining a path for said fluid;
3. signal-receiving means including means for generating hydraeric pressure differentials in said path;
4. a first valve member comprising
   a. a first displaceable member disposed in said means defining a path for said fluid and formed to meter low hydraeric fluid flow upon displacement thereof, and
   b. means for directing said pressure differentials generated by said signal-receiving means across said first displaceable member for displacement thereof to meter said flow through said first valve member; and
5. a second valve member, comprising
   a. a second displaceable member disposed in said means defining a path for said fluid and formed to meter high hydraeric fluid flow upon displacement thereof,
   b. means for directing said pressure differentials generated by said signal-receiving means across said second displaceable member for displacement thereof to meter said flow through said second valve member, and
   c. means connected to said second displaceable member for restraining said second displaceable member against displacement during displacement of said first displaceable member.

4. The valve of claim 3 including feedback means connected between said first displaceable member and with said signal receiving means for limiting pressure differentials across said first displaceable member to relatively low levels over its displacement range.

5. The valve of claim 4 wherein said restraining means is formed to exert a displacement resisting force in excess of said low-level pressure differentials.

6. The valve of claim 3 wherein said signal means is formed to generate sufficient hydraeric pressure differential to fully displace said first displaceable member at substantially less than full differential generating capacity.

7. The valve of claim 3 including: means defining load ports; first metered fluid flow paths between said load ports and said first displaceable member and metered by said first displaceable member; and second metered fluid flow paths between said load ports and said second displaceable member, metered by said second displaceable member and independent of said first metered paths.

8. The valve of claim 3 wherein said first and second displaceable members are comprised of first and second spools, respectively, and including means defining chambers in said path for said spools including end chambers for said pressure differentials.

9. The valve of claim 8 wherein said second spool end chambers are hydraerically connected to said first spool end chambers.

10. The valve of claim 8 including a centering spring connected to said second spool for restraining said second spool against displacement during said first spool displacement.

11. The valve of claim 10 including feedback means, connected between said first spool and said signal receiving means, for limiting pressure differentials across said first spool over its displacement range to less than said spring restraint.